United States Patent [19]
Oestreich

[11] 4,199,224
[45] Apr. 22, 1980

[54] COMMUNICATION CABLE UTILIZING OPTICAL TRANSMISSION ELEMENTS

[75] Inventor: Ulrich Oestreich, Münich, Fed. Rep. of Germany

[73] Assignee: Siemens Aktiengesellschaft, Berlin and Munich, Fed. Rep. of Germany

[21] Appl. No.: 621,400

[22] Filed: Oct. 10, 1975

[30] Foreign Application Priority Data

Oct. 15, 1974 [DE] Fed. Rep. of Germany ....... 2449439

[51] Int. Cl.² .................................. G02B 5/16
[52] U.S. Cl. .................................. 350/96.23
[58] Field of Search ...................... 350/96 B, 96 C

[56] References Cited
U.S. PATENT DOCUMENTS

| | | | |
|---|---|---|---|
| 3,498,286 | 3/1970 | Polanyi et al. | 350/96 B X |
| 3,766,307 | 10/1973 | Andrews, Jr. | 350/96 B X |
| 3,865,466 | 2/1975 | Slaughter | 350/96 B |
| 4,038,489 | 7/1977 | Stenson et al. | 350/96 B X |

FOREIGN PATENT DOCUMENTS 2347408  4/1974  Fed. Rep. of Germany ......... 350/96 B Primary Examiner—Rolf G. Hille
Attorney, Agent, or Firm—Kenyon & Kenyon

[57] ABSTRACT

An optical cable is constructed using a core of high tensile strength steel wires around which is disposed a radial system of chambers in the form of a helix retaining the optical conductors so that they are movable radially thereby protecting the optical conductors from tensile, compression and flexural stresses.

10 Claims, 3 Drawing Figures

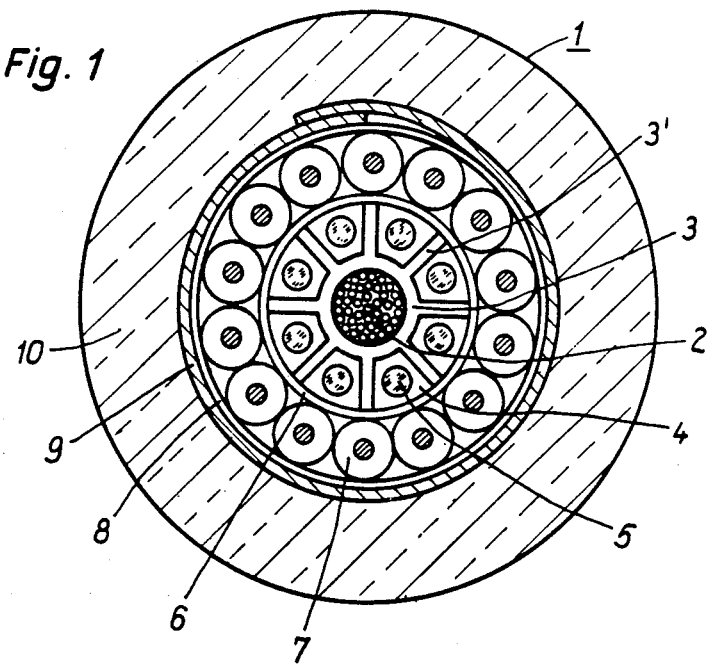
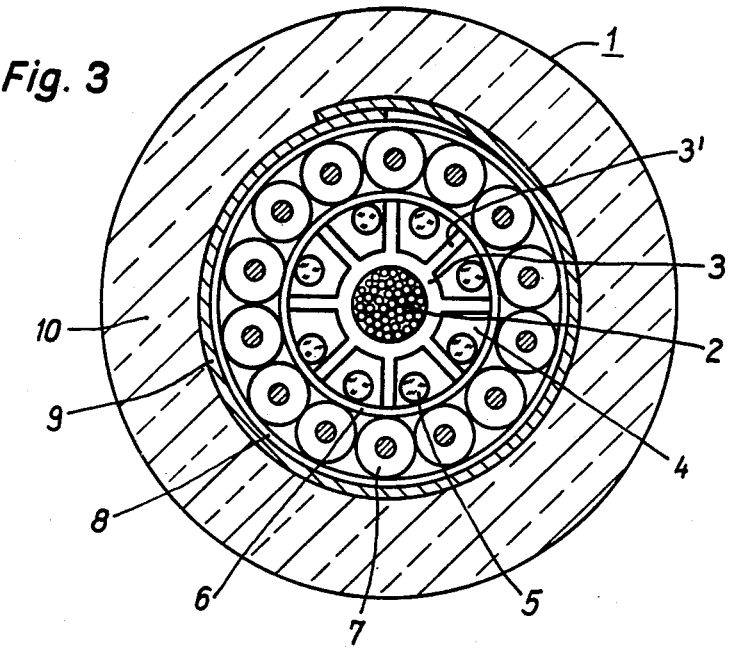

COMMUNICATION CABLE UTILIZING OPTICAL TRANSMISSION ELEMENTS

BACKGROUND OF THE INVENTION

This invention relates to optical transmission cables in general in more particularly to an improved optical communications cable which provides improved protection against tensile, compressive and flexural stresses.

In the recent years there has been a great deal of activity in the field of transmission of information using light waves. These developments have led to the possibility of using optical transmission cables utilizing glass fibers for guiding light beams. In other words such optical cables can be used in some instances to replace electrical transmission cables, the glass fibers being used instead of electrical conductors. Generally such glass fibers consist of a core made of a material with a hight index of refraction and a coat surrounding the core, the coat being made of a material having a smaller index of refraction. Optionally a protective outer jacket of polymer material such a varnish may be provided.

One type of optical cable utilizing a transmission element in which several glass fibers are arranged about a central plastic filament is known. The cross section of the plastic filament is developed to have several ribs with the glass fibers inserted along channels between adjacent ribs and secured in place by means of a plastic jacket. Such as disclosed in German Offenlegungsschrift No. 2,347,408 laid open Apr. 4, 1974 (Claim 1). Several such transmission elements can be used to construct an optical cable with the transmission elements arranged with an elongated central core of, for example, a multiplicity of twisted steel wires. In such a case the transmission elements are arranged about the steel core to form a layer. The purpose of the core is to provide reinforcement to take up tensile stresses. Over the layer or layers of the optical cable additional layers including insulated electrical conductors can be provided. Over the outside of the cable an outer plastic of an olefin ploymerisate or of polyethylene is placed. This jacket may then be surrounded with an additional jacket of a material of low coefficient of friction. Such an arrangement is disclosed in German Offenlegungsschrift No. 2,355,855 laid open May 16, 1974 (Claim 1, 11, 16, 18).

In another prior art optical cable the starting point is also a core built up of twisted steel wires for use as central reinforcing element. On this cable a layer of, for example, foamed plastic is first applied. Over this layer the optical transmission elements are arranged in one or more layers. For this purpose, the optical fibers are fastened into a flexible, flat mounting component which is wound in helical fashion around the central core. On top of the wound transmission elements is placed an additional layer of foamed plastic and following that an open braid of metal ribbon and the outside jacket of plastic, such as polyethylene. Such is disclosed in German Offenlegungsschrift No. 2,355,854 laid open May 16, 1974 (Claim 1, 17-21).

When designing optical cables, the sensitivity of the glass fibers used in the transmission elements to tensile, compressive and flexural stresses is of utmost importance. These factors are taken into account in the known cable design primarily by providing a core of high tensile strength and of cushioning intermediate layers between the core and transmission elements as well as providing cushioning between the elements and the outer jacket. Such however does not provide sufficient protection against tensile stresses and against radial compressive stresses exerted on the cable. Elongation of the core of high tensile strength steel when stressed must be withstood by the optical transmission elements. Complete protection against compression and tensile stresses, which in some circumstances may occur in the twisting of the transmission elements to form the cable core, is not adequately provided. Such complete protection which must also be sufficient for extended periods of operation under mechanical stress, is, however, a basic requirement for practical device. In view of this, the need for an improved optical cable, the transmission elements of which are protected to an extremely high degree against tensile, compressive and flexural stresses of all kinds becomes evident.

SUMMARY OF THE INVENTION

The present invention provides such a cable. In accordance with present invention the starting point is a plurality of optical transmission elements arranged about a core of high tensile strength steel wires with the steel wire core embedded in a plastic enclosure and the overall arrangements surrounded by an outer jacket. In accordance with the present invention, the optical transmission elements are movably arranged in chambers which are disposed helically about the cable axis and formed in the plastic enclosure disposed about the high strenth core. In other words a radial chamber system which has a cross section looking like the spokes of a wheel is formed of thermoplastic material. The chambers are open in the radial direction. Within these chambers are disposed the optical transmission elements. The chambers are closed on their outer radial edges by a wrapping.

In an optical cable designed in this manner, the optical transmission elements are not connected with other elements of the cable core in any positive manner as in previously known cable structures. Instead they lie freely within a chamber system which is in turn connected to the other elements of the cable core in a positive manner. As a result, no excessive mechanical stresses can be exerted on the optical transmission elements. Tensile stresses are taken up essentially by the high strength core of steel wires. An elastic elongation of the core will only lead to a reduction of the helix radius of the chambers in which the optical transmission elements lie, i.e. it will result in a decrease of the radial distance of the transmission elements from the high strength core. In order to achieve the greatest possible mobility of the the optical transmission elements in this respect it is advantageous that the optical transmission elements rest against the wrapping which is applied over the system of chambers when the cable is in an unstressed condition. The wrapping is applied immediately after the elements have been placed in the chamber and this serves as the outer confinement at the chamber and at the same time is a support for transmission elements inserted therein. If compression stresses are applied to the optical cable they are transmitted to the chamber system and the core through the outer jacket without exerting any stress on the optical transmission elements. In cases of flexural stresses of the cable, the optical transmission elements can adapt themselves to the prevailing curvature within the chambers of the chamber system through displacement.

The complete mechanical protection of the optical transmission elements depends not only on their freedom of movement within the chambers but also on the fact that the radial chamber is disposed helically about the core. In other words it exhibits what is known as a length of lay. This length of lay is advantageously between 0.2 and 2 m and more preferably 1 m. Through such an arrangement of the radial chamber system the optical transmission elements are also disposed helically about the core. In accordance with the disclosed embodiment, the radial chamber system can comprise, for example, a profiled strip placed over the high strength core. Preferably, it consists of a profiled body which is extruded onto the high strength core.

It should be noted that the optical transmission elements used in conjunction with the present invention can be individual, coated glass fibers which may be combined in bundles.

The mechanical protection of the transmission elements is further improved, particularly with regard to impact stresses, by placing between the wrapping applied over the radial chamber system and the outer jacket one or more cushion layers. A preferred form of outer jacket is what is referred to as a laminated jacket consisting essentially of a plastic sheath under which a thin metallic layer is placed. Of particular advantage is the use of what is known as corrugated steel jacket. Such a jacket offers excellent protection against compression stresses and can also provide additional reinforcement to take up tensile stresses.

In order to achieve the greatest possible tensile strength for the optical cable of the present invention and to insure adequate flexibility of the cable despite these measures take to obtain mechanical protection of the transmission elements, it is advisable that the high strength core comprise spring steel wires twisted in layers preferably wires of high alloy nickel steel are used.

An optical cable designed in accordance with the present invention can also be constructed as a longitudinally watertight cable, for example. If such is to be done the cavities in the radial chamber system are filled with a substance which will not freeze to insure the longitudinal watertightness of the cable. It is also possible to evacuate to core of the cable in order to maintain, for example, the mechanical strength and elasticity of the glass fibers which are disposed in the cable in a twisted condition in order to obtain a long service life for the glass fibers.

In order to manufacture the optical cable of the present invention as economically as possible, it is advisable to fabricate the cable in a single operation to the largest extent possible. Disclosed is an advantageous method and apparatus for such manufacture in which the high strength core is held in the stretched condition during fabrication. The high strength core is twisted about it own axis with a constant speed of rotation in order to obtain the desired of lay for the chamber system. The optical transmission elements are placed in the chamber system, being applied to the core with a pushing motion. Such a fabrication procedure insures a low inertia placement, largely free of tensile stresses on the optical conductors in the radial chamber system.

The described apparatus for carrying out such a fabrication includes a supply drum for supplying the high strength core of steel wires and a take-up device for the finished cable core. The supply drum and take-up device are arranged for rotation with the same constant speed of rotation about the axis of the core which is maintained in the stretched condition. Feeding devices for inserting the optical transmission elements into the chambers of the chamber system are arranged laterally to the strand held in stretched conditions.

To insert the optical transmission elements into the radial chamber in a manner such that they are free of tension it is advisable to use driven devices such as rollers, cylinders or caterpillar drives for such insertion. Such can be done either using positive control or by means of slippage. Since the radial chamber is disposed about the high strength core in helical fashion, the run off and assignment devices for providing the optical conductors can be arranged in a stationary relationship.

BRIEF DESCRIPTION OF THE DRAWINGS

FIG. 1 is a cross section through the optical cable of the present invention.

FIG. 3 is a cross section through an optical cable according to the present invention and similar to the optical cable in FIG. 1, but the optical conductors 5 rest against the covering 6.

DETAILED DESCRIPTION OF THE PREFERRED EMBODIMENT

Figure 2:
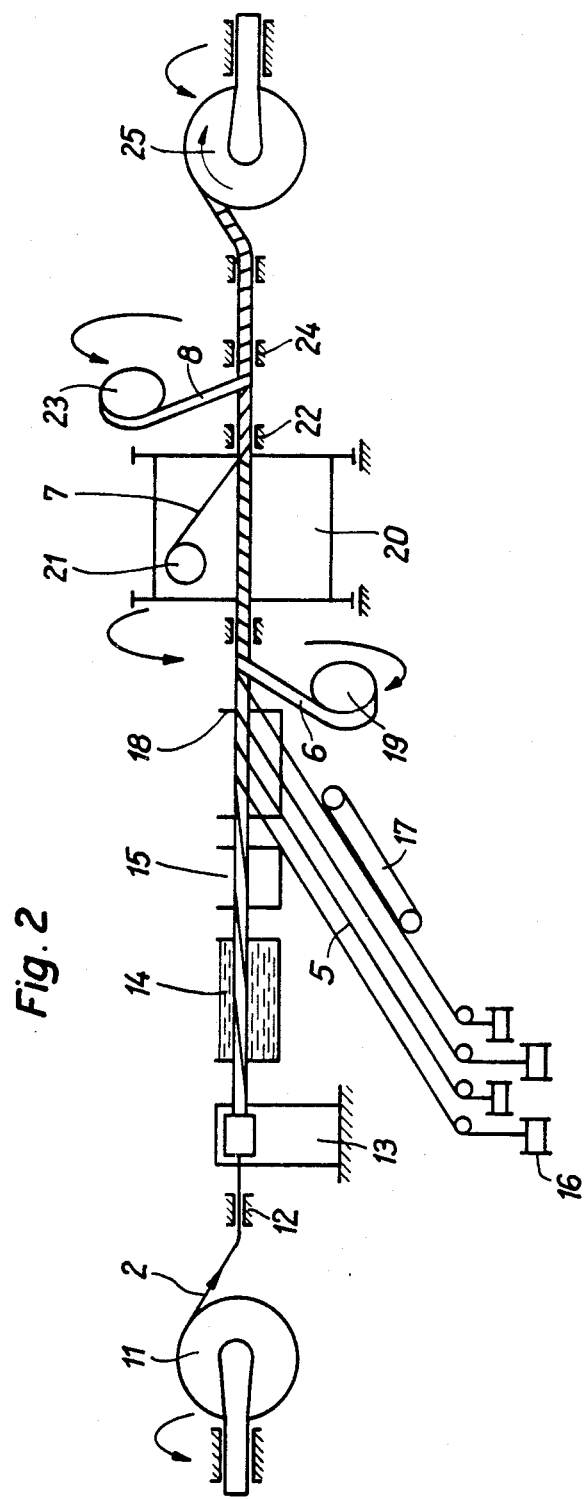
FIG. 2 is a schematic illustration of apparatus for constructing a cable according to the present invention.

FIG. 1 illustrates a cross section through an optical cable according to the present invention. The overall cable designated 1 has contained within it a plurality of optical conductors 5. The cable has a core 2 of high tensile strength made up of several twisted layers of steel wires of high alloy nickel steel. On the high strength core is disposed a radial chamber system 3 having a profile in the shape of the spokes of a wheel. As will be described in more detail below, this is preferably extruded onto the core 2. As shown, a plurality of chambers 4 are thus formed between the spokes 3' of the plastic profile. Typically the chambers will have a height of about 6 mm and a width of about 5 mm at the outer end of the spokes 3'.

The optical transmission elements 5 are inserted in the chambers 4. These may be individual optical conductors or conductor bundles in a twisted or untwisted condition. The transmission elements are disposed losely in the chambers 4 and held therein by means of a wrapping 6 wrapped over the radial chamber system 3.

Disposed about the wrapping 6 is a layer of electrical conductors 7. These are used primarily for power purposes such as for supplying current to associated equipment. On top of the layer of conductor 7, which are preferably twisted, is a wrapping 8 of crepe paper, which acts as a cushion and also provides thermal protection for a cable over which the outer jacket is provided. The outer jacket is a jacket of the type referred to as a laminated jacket comprising of thin metal ribbon 9 applied by wrapping longitudinally and having overlapping ribbon edges over which is placed a polyethylene sheath 10. The thin metal ribbon 9 and plastic sheath 10 are cemented together using a suitable cementing agent.

Manufacture of such a cable can be carried out using apparatus such as that shown on FIG. 2. Shown are the means for applying all layers except the outer laminated sheath. Shown is a supply drum containing thereon a supply of the steel core and a winding device 25 for taking up the finished cable. Both are arranged for rotation about a central axis along which the cable core 2 is held in stretched condition. Both are arranged to rotate with the same speed and direction of rotation. The core 2 runs from the supply drum 11 through a guide means 12 and through the head of extruder 13 which extruded the radial chamber system 3 onto the core in conventional fashion. The core 2 with the chamber 3 thereon is then passed through a cooling trough 14 containing water for cooling the extruded plastic. It then passes through an adjoining drying section 15. Thereupon, the core, which now has the spokelike profile, travels into a device 18 in which the optical transmission elements 5 are placed into the chamber system. Immediately thereafter a spinner 19 is provided for placing over the chambers with the transmission elements therein a plastic tape 6. This wrapping confines the radial position of the optical transmission elements 5. The wrapping of plastic tape for this purpose should be air and water permeable to permit drying and/or evacuation of the cable core.

In order to insert the optical transmission elements 5 into the radial chamber system system without force, the transmission elements run off from the supply containers 6 and are shot or inserted into the chambers using feeding devices 17 of which only one is shown in order to simplify the drying. In order to achieve uniform feeding of the optical transmission elements, the feeding device 17 operates with slippage.

Once the wrapping 6 is applied, the electrical conductors 7 are run off from supply reels 21 and applied to the core in a cabling head 22. Immediately thereafter, crepe paper 8 is applied ahead of guide means 24 using a spinning device 23. The finished cable core, after passing through guide means 24, is subsequently wound up on the takeup drum 25. Optionally, a pulloff device in the form of caterpillar drive may be provided instead of takeup drum 25.

Thus an improved optical transmission cable and a method and apparatus for making such a cable have been shown and described. Although specific embodiments have been illustrated, and described, it will be obvious to those skilled in the art the various modifications can be made without departing from the spirit from the invention which is intended to be limited solely by the appended claims.

I claim:

1. An optical cable for information transmission comprising:
   (a) a core of steel wires;
   (b) a plastic profile member surrounding said core, said member having a cross section in the form of the spokes of a wheel with the spokes forming radial chambers, the chambers disposed about the cable axis in helical fashion;
   (c) optical elements movably disposed in each of said chambers;
   (d) a covering of thermoplastic material applied over the circumference of said plastic member covering the outer radial extreme of said chambers; and
   (e) an outer jacket.

2. A cable according to claim 1 wherein said optical transmission elements are disposed within said chambers so as to rest against said covering when said cable is in an unstressed condition.

3. A cable according to claim 1 wherein said plastic member comprises a profiled strip placed over said high strength core.

4. A cable according to claim 1 wherein said plastic member comprises a profiled body extruded onto said high strength core.

5. A cable according to claim 1 wherein the length of lay of the chambers formed in said plastic member is between 0.2 and 2 m.

6. A cable according to claim 5 wherein said chambers have a length of lay of approximately 1 m.

7. A cable according to claim 1 wherein said transmission elements comprise individual, coated glass fibers.

8. A cable according to claim 1 wherein at least one twisted layer of insulated electrical conductors is arranged between said wrapping and said outer jacket.

9. A cable according to claim 1 and further including at least one cushioning layer between said wrapping and said outer jacket.

10. A cable according to claim 1 wherein said optical transmission elements comprise individual, coated glass fibers disposed within said chambers so as to rest against said covering when said cable is in an unstressed condition.

* * * * *